(12) United States Patent
Onuma et al.

(10) Patent No.: US 7,538,897 B2
(45) Date of Patent: May 26, 2009

(54) PRINT CONTROL DEVICE HAVING PRINT CANCEL FUNCTION, DATA PROCESSING METHOD, COMPUTER PROGRAM, AND COMPUTER READABLE STORAGE MEDIUM

(75) Inventors: Nobuo Onuma, Ohta-ku (JP); Tomoyuki Watanabe, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 928 days.

(21) Appl. No.: 10/723,741

(22) Filed: Nov. 25, 2003

(65) Prior Publication Data
US 2004/0120000 A1 Jun. 24, 2004

(30) Foreign Application Priority Data
Dec. 6, 2002 (JP) ............................. 2002/354706

(51) Int. Cl.
G06K 15/00 (2006.01)
G06F 3/12 (2006.01)
(52) U.S. Cl. ..................................... 358/1.14; 358/1.15
(58) Field of Classification Search .................. 358/1.1, 358/1.9, 1.11–1.18, 401, 406, 426.02, 426.06, 358/452, 504; 347/14, 106
See application file for complete search history.

(56) References Cited

U.S. PATENT DOCUMENTS 6,453,268 B1 * 9/2002 Carney et al. ................ 702/186
7,072,065 B2 * 7/2006 Lester et al. ................ 358/1.15

* cited by examiner

*Primary Examiner*—Dov Popovici
*Assistant Examiner*—Thierry L Pham
(74) *Attorney, Agent, or Firm*—Canon USA Inc IP Division

(57) ABSTRACT

A print control device including an acquisition unit for acquiring print conditions in response to a print request, a fixing unit for fixing a frequency of determining a print cancel based on the print conditions acquired by the acquisition unit, and a determining unit for determining whether a print cancel command is issued as the data processing unit generates and/or transfers print data at the frequency fixed by the fixing unit. The print control device thus determines the presence or absence of a print cancel command at an appropriate frequency under an environment that permits no multitasking. A response process from the reception of the print cancel command to the execution of a cancel operation becomes uniform, resulting in unnecessary waiting time and useless printing actions.

16 Claims, 5 Drawing Sheets

FIG. 2

PRINT CANCEL CHECK FREQUENCY TABLE 12d

| SHEET SIZE | COLOR | | MONOCHROME | |
|---|---|---|---|---|
| | RESOLUTION | | | |
| | 300 | 600 | 300 | 600 |
| CARD | 32 | 16 | 64 | 32 |
| A4 | 24 | 12 | 56 | 28 |
| L SIZE | 26 | 14 | 52 | 26 |
| 2L SIZE | 48 | 24 | 64 | 32 |

FIG. 5

STORAGE MEDIUM SUCH AS FD/CD·ROM

| DIRECTORY INFORMATION |
|---|
| FIRST DATA PROCESSING PROGRAM<br>PROGRAM CODE GROUP CORRESPONDING TO STEPS<br>IN FLOW DIAGRAM SHOWN IN FIG. 3 |
| |

MEMORY MAP OF STORAGE MEDIUM

PRINT CONTROL DEVICE HAVING PRINT CANCEL FUNCTION, DATA PROCESSING METHOD, COMPUTER PROGRAM, AND COMPUTER READABLE STORAGE MEDIUM

BACKGROUND OF THE INVENTION

1. Field of the Invention

The present invention relates to a print control device, a data processing method, a computer program, and a computer readable storage medium for generating, in response to an issued print request, print data interpretable by a printer from image data produced by an application, transferring the print data to the printer, and providing a print cancel function.

2. Description of the Related Art

Means for canceling a print operation is available in known printers. If any error is found in the middle of the printing operation performed through a printer driver, the means is used to cancel the print operation.

A control method for the print cancel is typically subject to the limitation of the function of an operating system (OS) and a printing system. For example, under an environment where multi-task operations relating to printing are enabled, a task of controlling the generation of print data and the transmission of the print data and a task of accepting a print cancel from the user are separately managed. The task of accepting the print cancel, constantly monitoring the presence of the print cancel request, receives the print cancel request at any timing.

Under an environment that permits no multitasking (under a single task environment), a printer in a typical control method thereof checks, during an interval between the generation of the print data and the transmission of the print data, whether a print cancel request is issued by the user.

In the above control method, the length of a time lag between the print cancel request issued by the user and an actual suspension of the printing operation is determined by time intervals between the checks of the issues of the print cancel request.

The time intervals between the checks of the issues of the print cancel request, if too short, adversely affect the speed of the generation of the print data and the transfer of the print data, both of which are major purposes of the printer. Conversely, if the time intervals are too long, the response to the print cancel request is degraded.

For example, the print cancel is checked every half page in the printing of a document of one page. Even if a print cancel button is pressed to issue a print cancel request immediately subsequent to the start of the printing operation, the printer driver is unable to detect the occurrence of the print cancel request until at least half the page is completed. The response to the print cancel request is thus delayed by duration of time required to print half the page.

The user typically desires to suspend an erroneous printing when the user notices the erroneous printing. A quick response to the print cancel is desired in many cases. If the time lag occurs during which the user is not sure whether or not the printer is currently responding to the request, the user typically presses the print cancel button repeatedly, and may fret about waiting.

In a printing system that spools print data before transferring the print data, a response delay to a print cancel request causes sheets to be consumed in vain if the print cancel request is detected after the generation of print data of a next page and the transfer of the print data have started.

Depending on print conditions, the printer driver detects the print cancel request sometimes quickly but sometimes slowly.

For example, a unit of throughput is 36 lines, and the presence or absence of the print cancel request is checked each time the printer driver receives image data of 36 lines from an application, produces print data and transfers the print data to a printer. The response to the print cancel request is different between color printing and monochrome printing. In the color printing operation, the print cancel request is checked after the time elapse for 36 lines times the number of colors (4 for the CMYK system, for example). In contrast, the monochrome printing allows the print cancel request to be checked each time data of 36 lines times one (monochrome) is processed.

The time difference between the color printing and the monochrome printing directly determines the response to the print cancel issued by the user. As a result, if the print cancel request is always checked every 36 lines, variations occur in the response.

This inconvenience occurs not only because of the difference between the color printing and monochrome printing, but also because of a resolution difference between 600 dpi and 300 dpi, or because of a sheet size difference between A4 and A3, even if the throughput remains unchanged from 36 lines. These differences also affect the response as much as the difference between the color printing and the monochrome printing does.

The uniform control of the monitoring time for detecting the print cancel request degrades the response feature depending on the print environment.

SUMMARY OF THE INVENTION

Accordingly, it is an object of the present invention to flexibly organize a convenient print cancel environment under which the user enjoys a uniform response from the reception of a print cancel request to the execution of a cancel process, free from fretting about unnecessary waiting time. A mechanism generates print data interpretable by a printer from image data produced by an application in response to a print request, and transfers the print data to the printer. The mechanism has a print cancel function. The mechanism determines the presence or absence of a print cancel request, at the frequency of determination that is performed based on the print request, during a process of the print request. Under an environment that permits no multitasking, the presence or absence of the print cancel request is determined at an optimum frequency.

To achieve the above object, a print control device of the present invention includes a data processing unit for generating and/or transferring print data in response to a print request, an acquisition unit for acquiring print conditions in response to the print request, a fixing unit for fixing a frequency of determining a print cancel based on the print conditions acquired by the acquisition unit, and a determining unit for determining whether a print cancel command is issued as the data processing unit generates and/or transfers the print data at the frequency fixed by the fixing unit.

Further objects, features and advantages of the present invention will become apparent from the following description of the preferred embodiments with reference to the attached drawings.

BRIEF DESCRIPTION OF THE DRAWINGS

FIG. 2 is a table listing a print cancel check frequency shown in FIG. 1.

FIG. 5 is a memory map of the storage medium that stores a variety of data processing programs readable by the print control device of one embodiment of the present invention.

DESCRIPTION OF THE PREFERRED EMBODIMENTS

The preferred embodiments of the present invention will now be discussed with reference to the drawings.

Figure 1:
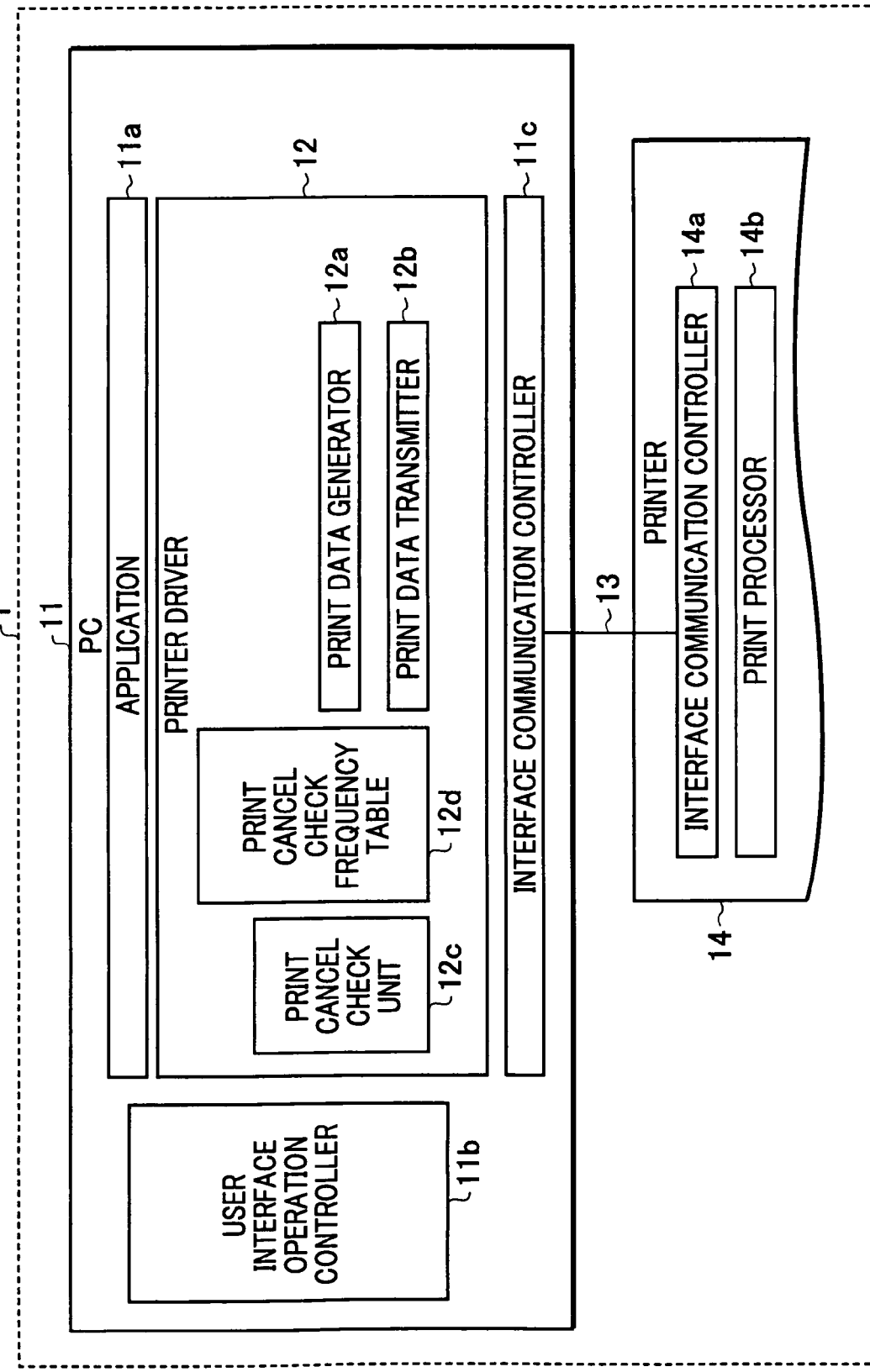
FIG. 1 is a block diagram illustrating a printing system incorporating a print control device in accordance with one embodiment of the present invention.

FIG. 1 is a block diagram illustrating a print control system 1 incorporating a print control device in accordance with one embodiment of the present invention.

As shown, the print control system 1 includes a personal computer (PC) 11 and a printer 14 that is interconnected to the PC 11 through an external interface cable 13.

The external interface cable 13 may be wired or wireless (such as the Bluetooth®), or may be an interface that functions on a onepoint to onepoint connection basis or on a onepoint to multipoint connection basis.

In this embodiment, the print control system 1 includes the PC 11. The PC 11 includes but is not limited to a personal computer compatible with Windows® OS, a Macintosh® personal computer, or a so-called non-PC (such as WebTV® system, or SetTopBox).

The PC 11 includes an application 11a that provides a print environment and issues a print request, a user interface operation controller 11b that provides a print cancel button and an operation environment under which images are drawn on the application, an interface communication controller 11c that transfers data to the printer 14 through the external interface cable 13, and a printer driver 12.

The printer driver 12 includes a print data generator 12a that receives image data from the application 11a and converts and generates the image data into print data in a format with which the printer 14 is compatible, a print data transmitter 12b that transmits the generated print data to the printer 14 through the interface communication controller 11c, a print cancel check unit 12c that checks whether a print cancel command is issued, and a print cancel check frequency table 12d that indicates the frequency of checks for checking the print cancel command according to each of predetermined print conditions such as a sheet size, a printing resolution, a setting of color printing or monochrome printing.

The printer 14 includes an interface communication controller 14a that receives the print data from the PC 11, and a print processor 14b that executes printing.

FIG. 2 illustrates one example of the print cancel check frequency table 12d of FIG. 1. The print cancel check frequency table 12d lists how frequently the print cancel check is performed. More specifically, it lists the number of lines to be processed per print cancel check. The number of lines to be processed per print cancel check is based upon factors such as sheet size, resolution, and type of printing (i.e., color or monochrome).

For example, per the print cancel check frequency table 12d, a value of 12 is obtained when the print conditions designated by the application 11a are a sheet size of A4 and color printing is performed at a resolution of 600 dpi.

In response to the image data received from the application 11a, under this condition, the checking for a print cancel command is performed every time 12 lines of print data is generated and/or transferred.

In the case where the print condition is a sheet size of A4 and color printing is performed at a resolution of 300 dpi, the print cancel check frequency value becomes 24.

The latter frequency value of 24 is greater than the former frequency value of 12. The print cancel check performed every 24 lines allows the user to detect the generation of a print cancel command at the same timing as the print cancel check performed every 12 lines at a resolution of 600 dpi.

At a resolution of 300 dpi, the number of pixels of the image data forming one line in a horizontal direction of a A4 sheet is half the number of pixels at a resolution of 600 dpi. The process time required by the printer driver to process one line is also halved.

If it takes 0.02 ms for the printer driver to process 12 lines at a resolution of 600 dpi, it also takes 0.02 ms for the printer driver to process 24 lines at a resolution of 300 dpi. These values are registered as a print cancel check frequency.

In addition to the resolution, the difference between color printing and monochrome printing also affects the print cancel check frequency value.

In the above discussion, if the resolution is halved, the print cancel frequency value is doubled. In practice, the parameters are not always proportional to each other. The print cancel check frequency table 12d is preferably optimized and then completed using actually measured values.

In the above discussion, the print cancel check frequency value is determined using a throughput corresponding to 0.02 ms as a unit. Performing actual operations is advisable to determine the time that presents an optimum response to the print cancel command.

In the example of the print conditions shown in FIG. 2 of the preferred embodiment, the number of lines per print cancel check is determined according to the sheet size, and the resolution in color printing and monochrome printing. The print conditions are not limited to these parameters only, and any parameters that would allow practice of the present invention would be applicable.

Figure 3:
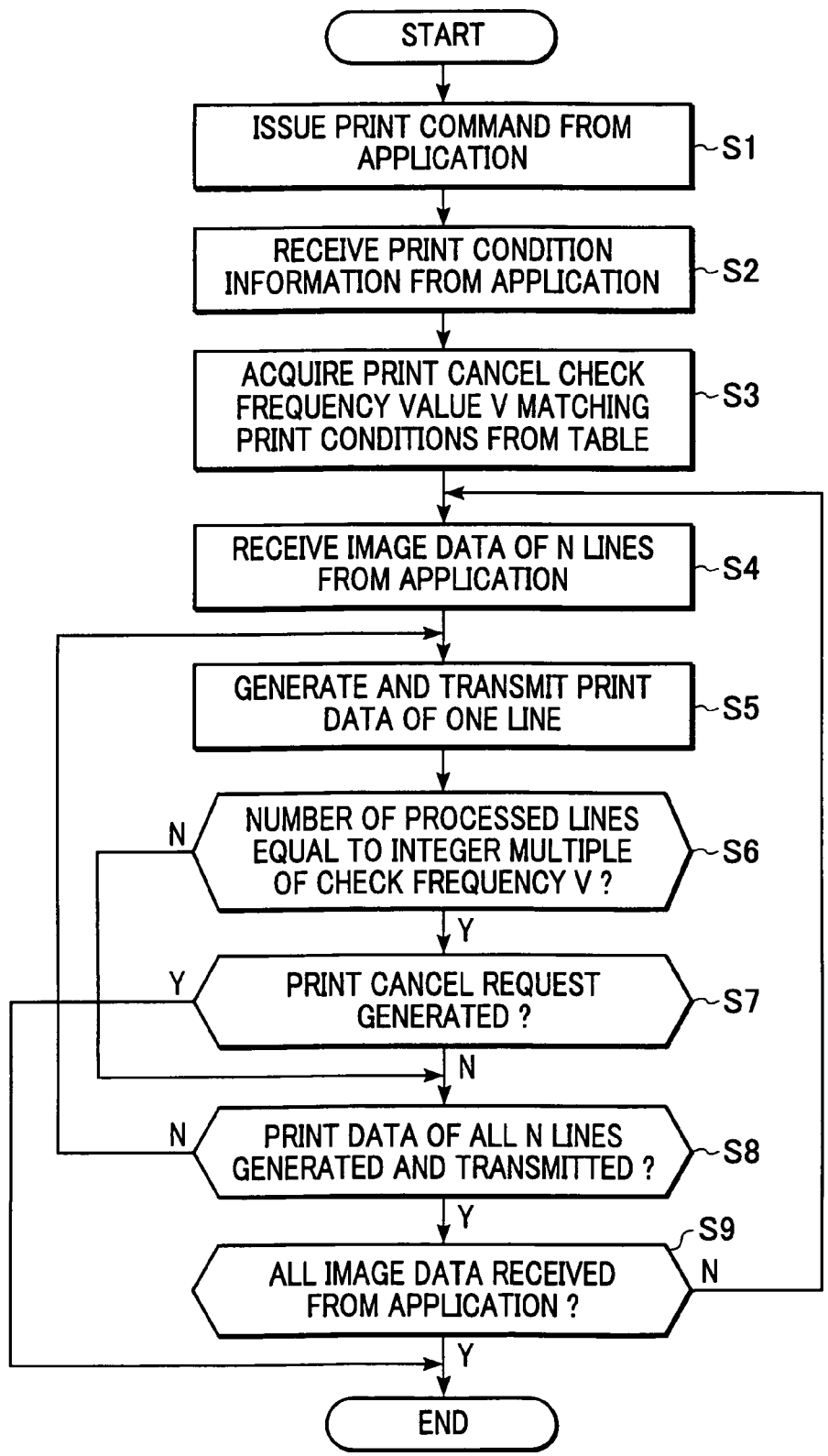
FIG. 3 is a flow diagram illustrating a data processing procedure of the print control device in accordance with one embodiment of the present invention.

FIG. 3 is a flow diagram illustrating a data processing procedure in the print control system 1 of the preferred embodiment of the present invention. The data processing procedure is performed by the print cancel check unit 12c in the printer driver 12 illustrated in FIG. 1. Steps S1 through S9 designate steps performed by the print cancel check unit 12c. In the data processing procedure, a program file stored in a storage medium is loaded onto a random-access memory (RAM) (not shown) and is then executed by a central process unit (CPU) controlling the process illustrated in FIG. 3.

In step S1, the application 11a draws images and produces image data, and issues a print request of the image data to the printer driver 12.

In step S2, the printer driver 12 acquires the print conditions, namely, information relating to a printing operation, such as the sheet size, the resolution, and the setting of color printing or monochrome printing.

In step S3, the printer driver 12 obtains, from the print cancel check frequency table 12d, the print cancel check frequency V matching the print conditions acquired in step S2, namely information about the number of lines of the print data generated and/or transmitted per print cancel check.

For example, if the print conditions acquired in step S2 are a sheet size of A4 and a resolution of 600 dpi in the color printing, the print cancel check frequency V becomes 12. The printer driver 12 thus checks whether a print cancel command has been issued, each time the print data of 12 lines is generated and/or transferred.

The remainder of the algorithm (procedure) will be discussed based on a print cancel check frequency V of 12.

In step S4, the printer driver 12 receives the image data of N lines from the application 11a. The image data received from the application 11a is typically in a RGB 12 bit format. The image data may be in a YCC format if the application 11a is of the type that handles a joint photographic expert group (JPEG) image. The present invention is not limited to any particular format and any format that would enable practice of the present invention is applicable.

The number of lines of N in the image data handed over from the application 11a is variable depending on the memory status assigned for printing. Generally, if the memory has sufficient room, the number N becomes large, and vice versa.

When the printing operation of the preferred embodiment is performed on a sheet having a sheet size of A4, the length of a printing area of the sheet is 287 mm out of the sheet's total longitudinal length of 297 mm.

In the following discussion, the number of lines N, which is variable depending on the memory status, is presumed to be 36. If the image data handed over from the application 11a is 36 lines, the length of 287 mm of the printing area of the A4 sheet corresponds to 6,779 lines in a resolution of 600 dpi. The printer driver 12 must receive the image data of 36 lines from the application 11a 189 times (=6,779/36).

In step S5, the printer driver 12 produces print data of one line from the image data of the 36 lines received from the application 11a, and transfers the pint data to the printer.

In step S6, the printer driver 12 checks whether the cumulative number of lines of the print data generated and/or transferred in step S5 is an integer multiple of the print cancel check frequency V acquired in step S3. In the present example, if the printer driver 12 determines that the cumulative number of lines is an integer multiple of 12, such as 12 or 24, the algorithm proceeds to step S7. If the printer driver 12 determines that the cumulative number of lines is not an integer number of 12, the algorithm proceeds to step S8.

In step S7, the printer driver 12 refers to the print cancel check unit 12c to check whether a print cancel command is issued. If the printer driver 12 determines that a print cancel command is issued, the printing operation is immediately terminated.

If the printer driver 12 determines in step S7 that no print cancel command is issued, the algorithm proceeds to step S8.

In step S8, the printer driver 12 determines whether the image data of all 36 lines have been received from the application 11a in step S4, converted into the print data, and transmitted to the printer in step S5. If the printer driver 12 determines that the image data of all 36 lines has not been converted into the print data and nor transferred to the printer, the algorithm loops to step S5 to repeat the process in step S5 and subsequent steps.

If the printer driver 12 determines in step S8 that the 36 lines have been converted and transmitted, the algorithm proceeds to step S9.

In step S9, the printer driver 12 determines whether the cumulative number of lines of the print data converted and transmitted in step S5 reaches 6,779 lines corresponding to the sheets size (A4). In other words, the printer driver 12 determines whether all image data of the sheet size (A4) received from the application 11a is converted into the print data, and whether the print data is transmitted to the printer 14. If the printer driver 12 determines all image data has been received, the algorithm ends. If the printer driver 12 determines that the cumulative number of lines has not yet reached 6,779 lines corresponding to the sheet size (A4), the algorithm loops to step S4 to repeat the process in step S4 and subsequent steps.

The printer driver 12 has been discussed with the A4 sheet size and the printing area having a longitudinal length of 287 mm. The sheet size is not limited to A4, and if the sheet size of A4 is used, the printing area is not limited to 287 mm. Any size recording medium that would enable practice of the present invention would be applicable.

Figure 4:
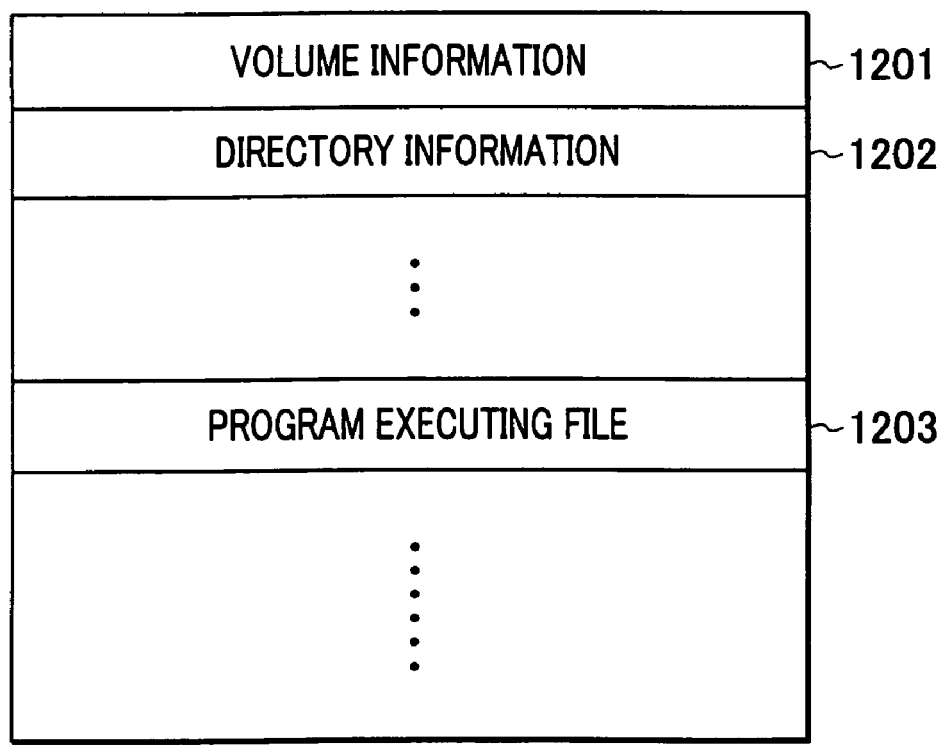
FIG. 4 illustrates a stored content in a storage medium that has recorded a data processing program illustrated in FIG. 3.

FIG. 4 illustrates a storage content of a storage medium recording the data processing procedure illustrated in FIG. 3 as a program.

The storage medium of this preferred embodiment stores volume information 1201, directory information 1202, program file 1203, etc.

A data processing program readable by the print control device of the present invention of a preferred embodiment of the present invention is discussed with reference to a memory map shown in FIG. 5.

FIG. 5 illustrates the memory map of the storage medium storing a variety of data processing programs readable by the print control device in accordance with the preferred embodiment of the present invention.

Information for managing a group of programs stored in the storage medium, such as version information, and information about programmers, is also stored. OS dependent information on a program reading device, for example, an icon for identifying the program, may also be stored, although these pieces of information are not shown.

Data belonging to each program is managed in the directory information 1202. Also, if a variety of programs and a program for installing the variety of programs are in the compressed form, a decompressing program may also be stored.

The functions of the printer driver 12 discussed with reference to FIG. 3 may be performed by a host computer having programs installed from the outside. A group of pieces of information including programs may be supplied to an output unit from a storage medium such as a CD-ROM, a flash memory, floppy drive (FD), or from an external storage medium through a network. Such an arrangement also falls within the scope of the present invention.

A storage medium storing program codes of the software program performing the functions of the above-referenced preferred embodiments of the present invention is installed in a system or an apparatus, and a computer (CPU or MPU) of the system or the apparatus reads and executes the program codes stored in the storage medium. Such an arrangement falls within the scope of the present invention.

The program codes read from the storage medium perform the novel functions of the preferred embodiments of present invention, and the storage medium storing the program codes falls within the scope of the present invention.

Available as storage media for supplying the program codes are a floppy disk, a hard disk, an optical disk, a magneto-optical disk, a CD-ROM, a CD-R, a magnetic tape, a nonvolatile memory card, an ROM, and EEPROM and the like.

By executing the program codes read by the computer, the functions of the preferred embodiments are performed. Furthermore, in response to the program codes, an operating system (OS) running on the computer or the like performs in whole or in part the process of the above-referenced preferred embodiments. As a result, the functions of the above-reference embodiments are thus performed. This arrangement falls within the scope of the present invention.

The program codes from the storage medium are read into a memory incorporated in a feature expansion board in the computer or in a feature expansion unit connected to the computer. The CPU mounted on the feature expansion board or the feature expansion unit performs partly or entirely the actual process in response to the instruction from the program codes. The functions of the above embodiment are executed through the process. Such an arrangement falls within the scope of the present invention.

The present invention is not limited to the above-referenced embodiments, and a variety of changes (including a combination of the embodiments) are possible without departing from the scope of the present invention.

The present invention has been discussed with reference to the specific embodiments, and those who are skilled in the art may understand that the spirit and scope of the present invention are not limited to the above-referenced embodiments. The following preferred embodiments also fall within the scope of the present invention. The first through seventeenth preferred embodiments are discussed below.

First Preferred Embodiment

A print control device of a first preferred embodiment of the present invention includes a data processing unit for generating and/or transferring print data in response to a print request, an acquisition unit for acquiring print conditions in response to the print request, a fixing unit for fixing a frequency of determining a print cancel based on the print conditions acquired by the acquisition unit, and a determining unit for determining whether a print cancel command is issued as the data processing unit generates and/or transfers the print data at the frequency fixed by the fixing unit.

Second Preferred Embodiment

In a second preferred embodiment of the present invention, the fixing unit fixes, based on the print conditions acquired by the acquisition unit, the throughput at which the print cancel is determined, and the determining unit determines whether the print cancel command is issued as the print data at the throughput fixed by the fixing unit is generated and/or transferred.

Third Preferred Embodiment

In a third preferred embodiment of the present invention, the print control device further includes a receiving unit for receiving the print cancel command of the print data through a user interface.

Fourth Preferred Embodiment

In the print control device of a fourth preferred embodiment of the present invention, the print conditions include at least one of a sheet size, resolution, and a designation of one of color printing or monochrome printing.

Fifth Preferred Embodiment

In the print control device of a fifth preferred embodiment of the present invention, the printer driver is installed in a data processing apparatus or a terminal other than the data processing apparatus.

Sixth Preferred Embodiment

A sixth preferred embodiment of the present invention relates to a data processing method for a print control device which includes a printer driver for generating print data, printable by a printer, from image data drawn by an application in response to a print request and transferring the generated print data to the printer. The data processing method includes a receiving step (not shown) for receiving a print cancel command of the print data, a determining step for determining whether the print cancel command is received in the receiving step (step S7 in FIG. 3), and a fixing step for fixing a frequency of the print cancel check to be performed in the determining step (step S3 in FIG. 3).

Seventh Preferred Embodiment

In the data processing method of a seventh preferred embodiment of the present invention, the print conditions includes varied estimated required time per unit throughput.

Eighth Preferred Embodiment

In the data processing method of an eighth preferred embodiment of the present invention, the receiving step includes receiving the print cancel command of the print data through a user interface.

Ninth Preferred Embodiment

In the data processing method of a ninth preferred embodiment of the present invention, the print conditions include at least one of a sheet size, resolution, and a designation one of color printing or monochrome printing.

Tenth Preferred Embodiment

A tenth preferred embodiment of the present invention relates to a computer readable storage medium storing a program for performing the data processing method stated in one of the ninth and eleventh preferred embodiments.

Eleventh Preferred Embodiment

An eleventh preferred embodiment of the present invention relates to a computer program for performing the data processing method stated in one of the ninth through eleventh preferred embodiments.

In accordance with preferred embodiments of the present invention, the generation of the print cancel command is checked at the predetermined optimum frequency of print cancel check under the environment that permits no print multitasking is permitted. This arrangement prevents excessively frequent checking, thereby controlling a delay in the generation and transmission of the print data, and an adverse effect on the response to the print cancel request.

The time lag during which the user is not sure whether or not the printer is currently responding to the request is reduced. The user is free from repeatedly pressing the print cancel button and fretting about waiting.

In the printing system that spools print data before transferring the print data, the response to the print cancel request is improved. The printing system is thus free from the consumption of sheets in vain which is caused in the conventional art because, due to the time lag, the generation of the print data of the next page and the transfer of the print data are performed prior to the detection of the print cancel.

The response time to the print cancel is different depending on the print conditions in the conventional art. Since the print cancel generation is checked at the predetermined print cancel frequency, the print cancel is performed with a uniform response regardless of the print conditions.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A print control device comprising:
    data processing means for generating and transferring print data in response to a print request;
    acquisition means for acquiring print conditions in the print request;
    determining means for variably determining a frequency of checking whether a print cancel command is issued, based on the print conditions acquired by the acquisition means, the frequency being defined by an amount of the print data; and
    checking means for periodically checking whether a print cancel command is issued, the checking performed every time said data processing means generates or transfers the amount of print data corresponding to the frequency determined by the determining means while said data processing means generates or transfers the print data.

2. A print control device according to claim 1, further comprising receiving means for receiving the print cancel command of the print data through a user interface, wherein the checking means checks whether the print cancel command is received through the receiving means.

3. A print control device according to claim 1, wherein the frequency is a print throughput that is determined based on estimated time needed to perform unit throughput required in the print conditions.

4. A print control device according to claim 1, wherein the frequency is determined so that the product of the frequency and estimated time needed to perform unit throughput required in the print conditions remains unchanged under varying print conditions.

5. A print control device according to claim 1, wherein the frequency determined based on the print conditions is a print throughput, and wherein the print throughput is determined based on print cancel intervals.

6. A print control device according to claim 1, further comprising suspending means which suspends the generation or the transfer of the print data by a printer driver if the print cancel command has been received.

7. A print control device according to claim 1, wherein the print conditions comprise at least one of a sheet size, a resolution, and a designation of one of color printing or monochrome printing.

8. A data processing method for a print control device for generating and transferring print data in a print request, the control method comprising:
    an acquisition step for acquiring print conditions in response to the print request;
    a determining step for variably determining a frequency of checking whether a print cancel command is issued, based on the print conditions acquired in the acquisition step, the frequency being defined by an amount of the print data; and
    a checking step for periodically checking whether a print cancel command is issued, the checking performed every time the print control device generates or transfers the amount of print data corresponding to the frequency determined in the determining step while the print data is generated or transferred.

9. A data processing method according to claim 8, further comprising a receiving step for receiving the print cancel command of the print data through a user interface.

10. A data processing method according to claim 8, wherein the frequency is determined based on estimated time needed to perform unit throughput required in the print conditions.

11. A data processing method according to claim 8, wherein the frequency is determined so that the product of the frequency and estimated time needed to perform unit throughput required in the print conditions remains unchanged under varying print conditions.

12. A data processing method according to claim 8, wherein the frequency determined based on the print conditions is a print throughput, and wherein the print throughput is determined based on print cancel intervals.

13. A data processing method according to claim 8, further comprising a suspending step for suspending the generation or the transfer of the print data by a printer driver if the print cancel command is determined as being received.

14. A data processing method according to claim 8, wherein the print conditions comprise at least one of a sheet size, a resolution, and a designation one of color printing or monochrome printing.

15. A computer program carried by a computer readable medium for a data processing method of a print control device for generating and transferring print data in response to a print request, the computer program comprising program codes for executing:
    an acquisition step for acquiring print conditions in the print request;
    a determining step for variably determining a frequency of checking whether a print cancel command is issued, based on the print conditions acquired in the acquisition step, the frequency being defined by an amount of the print data; and
    a checking step for periodically checking whether a print cancel command is issued, the checking performed every time the print control device generates or transfers the amount of print data corresponding to the frequency determined in the determining step while the print data is generated or transferred.

16. A computer readable storage medium storing a computer program for a data processing method of a print control device for generating and transferring print data in response to a print request, the computer program comprising program codes for executing:
    an acquisition step for acquiring print conditions in the print request;
    a determining step for variably determining a frequency of checking whether a print cancel command is issued, based on the print conditions acquired in the acquisition step, the frequency being defined by an amount of the print data; and a checking step for periodically checking whether a print cancel command is issued, the checking performed every time the print control device generates or transfers the amount of print data corresponding to the frequency determined in the determining step while the print data is generated or transferred.

* * * * *